(12) United States Patent
Deeken et al.

(10) Patent No.: US 7,811,539 B2
(45) Date of Patent: Oct. 12, 2010

(54) DEVICE AND METHOD FOR FILTERING CONTAMINANTS

(75) Inventors: John S. Deeken, Perrysburg, OH (US); Paul Stasiewicz, Oregon City, OR (US)

(73) Assignee: Seagate Technology LLC, Scotts Valley, CA (US)

( * ) Notice: Subject to any disclaimer, the term of this patent is extended or adjusted under 35 U.S.C. 154(b) by 522 days.

(21) Appl. No.: 11/556,592

(22) Filed: Nov. 3, 2006

(65) Prior Publication Data
US 2010/0086460 A1    Apr. 8, 2010

Related U.S. Application Data

(60) Provisional application No. 60/733,073, filed on Nov. 3, 2005.

(51) Int. Cl.
*B01D 53/56* (2006.01)
(52) U.S. Cl. .............. 423/245.3; 423/245.1; 423/212; 423/213.2; 423/213.5; 423/213.7
(58) Field of Classification Search .............. 306/97.02, 306/97.03, 97.04; 29/603.03, 603.01, 830; 96/135, 147, 153, 154; 55/385.6, 486, DIG. 5; 423/212, 213.2, 213.5, 213.7, 245.1, 245.3
See application file for complete search history.

(56) References Cited

U.S. PATENT DOCUMENTS

| | | | |
|---|---|---|---|
| 5,030,260 | A | 7/1991 | Beck et al. |
| 5,124,856 | A | 6/1992 | Brown et al. |
| 5,500,038 | A | 3/1996 | Dauber et al. |
| 5,590,001 | A | 12/1996 | Ino et al. |
| 5,846,696 | A | 12/1998 | Ram et al. |
| 5,869,009 | A | 2/1999 | Bellefeuille et al. |
| 6,077,335 | A | 6/2000 | Schneider et al. |
| 6,153,160 | A | 11/2000 | Voss et al. |
| 6,356,407 | B1 | 3/2002 | Slezak |
| 6,433,957 | B1 | 8/2002 | Rudd et al. |
| 6,557,240 | B1 | 5/2003 | Voights |
| 6,616,903 | B2 | 9/2003 | Poles et al. |
| 6,654,201 | B2 | 11/2003 | Smith |
| 6,683,746 | B1 | 1/2004 | Kuroki et al. |
| 6,726,745 | B2 | 4/2004 | Tuma et al. |
| 6,750,050 | B2 * | 6/2004 | Gebhard et al. ............. 435/180 |
| 6,890,373 | B2 | 5/2005 | Nemoto et al. |

(Continued)

FOREIGN PATENT DOCUMENTS

WO    WO 02/45847    6/2002

(Continued)

*Primary Examiner*—Jennifer K Michener
*Assistant Examiner*—Heng M Chan
(74) *Attorney, Agent, or Firm*—Leanne Taveggia Farrell; Westman, Champlin & Kelly, P.A.

(57) ABSTRACT

A filter device and method for using a filter device. The filter device includes a catalyst for catalyzing the reaction of organic molecules, such as an oxidation reaction, and an adsorbent for adsorbing reacted organic molecules. As a result, gaseous contaminants that include organic molecules are reacted to alter the polarity and reduce the molecular weight of the molecules. The reacted molecules are then adsorbed using an adsorbent. The filter and method are particularly useful for reacting and capturing hydrocarbons such as aliphatic hydrocarbons from an enclosed space, such as a disk drive assembly.

12 Claims, 2 Drawing Sheets

U.S. PATENT DOCUMENTS

| | | |
|---|---|---|
| 6,930,219 B2 | 8/2005 | Shan et al. |
| 2002/0131200 A1* | 9/2002 | Tomioka .................. 360/97.02 |
| 2002/0134239 A1 | 9/2002 | Tang et al. |
| 2003/0188991 A1* | 10/2003 | Shan et al. .................. 208/113 |

FOREIGN PATENT DOCUMENTS

WO     WO 2004101963 A1 * 11/2004

* cited by examiner

DEVICE AND METHOD FOR FILTERING CONTAMINANTS

CROSS-REFERENCE TO RELATED APPLICATIONS

This application claims priority to U.S. Provisional Patent Application Ser. No. 60/733,073 filed on Nov. 3, 2005, which is incorporated herein by reference in its entirety.

FIELD OF THE INVENTION

The present invention relates to a device and method for capturing contaminants from within an enclosed space. The present invention is particularly applicable to capturing gaseous contaminants from within a computing device, such as a disk drive assembly.

BACKGROUND OF THE INVENTION

In many situations, there is a need to capture gaseous contaminants from within an enclosed space. For example, gaseous contaminants such as hydrocarbons can be harmful to persons who are temporarily confined within an enclosed space, such as an aircraft cabin. In addition to people, airborne contaminants such as hydrocarbons can also be harmful to sensitive electronic equipment, such as in a clean room for the manufacture of semiconductor products. Gaseous contaminants can be particularly harmful to sensitive electronic components that are disposed in a small, enclosed space, such as within a disk drive assembly.

By way of example, magnetic disk drive assemblies require a clean operating environment to prevent contamination of the various components contained within the assembly. Especially troublesome are organic vapors, which may condense on the surface of the magnetic disk, causing the read/write head to stick to the surface of the magnetic disk. For example, gaseous hydrocarbons, such as aliphatic hydrocarbons, are not susceptible to removal via electrostatic forces and are difficult to adsorb with traditional adsorbents.

There is a need for a filter device that facilitates the capture of gaseous contaminants, including non-polar hydrocarbons, such as aliphatic hydrocarbons.

SUMMARY OF THE INVENTION

According to one embodiment of the present invention, a method for capturing gaseous contaminants from within an enclosed space is provided. The method includes reacting gaseous contaminants disposed within an enclosed space to alter the polarity and reduce the molecular weight of the gaseous contaminants, and thereafter capturing impurities wherein the impurities include the reacted gaseous contaminants. The reacting step can include oxidizing the gaseous contaminants in the presence of a catalyst. The gaseous contaminants can include organic molecules and the oxidizing step can include reacting the organic molecules with oxygen in the presence of the catalyst. For example, the organic molecules can include organic acid esters and hydrocarbons, such as aliphatic hydrocarbons.

According to another embodiment, a method for capturing gaseous contaminants from a disk drive assembly is provided. The method includes the steps of reacting gaseous contaminants within a disk drive assembly with oxygen in the presence of a catalyst and adsorbing the reacted gaseous contaminants with an adsorbent that is disposed within the disk drive assembly.

According to another embodiment of the present invention, a filter adapted for use in a disk drive assembly is provided. The filter includes a catalyst that is adapted to oxidize gaseous organic molecules, where the catalyst is disposed on the surface of a porous substrate material, and an adsorbent that is adapted to adsorb oxidized gaseous organic molecules.

Numerous additional aspects, features and advantages of the present invention will become apparent to those skilled in the art upon consideration of the further description that follows.

DESCRIPTION OF THE INVENTION

The filter device and method of the present invention are applicable to the capture and sequestration of contaminant gaseous species from a variety of enclosed spaces. As used herein, an enclosed space is one that is physically separated from the surrounding environment by an enclosure, but that may permit limited or controlled circulation of air into and out of the enclosed space. Examples include relatively large enclosed spaces such as airplane cabins and clean rooms for the manufacture of semiconductors and similar devices. The enclosed space can also be defined by smaller enclosures for containing sensitive components, and in one embodiment the enclosure protects the components of a disk drive device that are disposed within the enclosed space.

Figure 1:
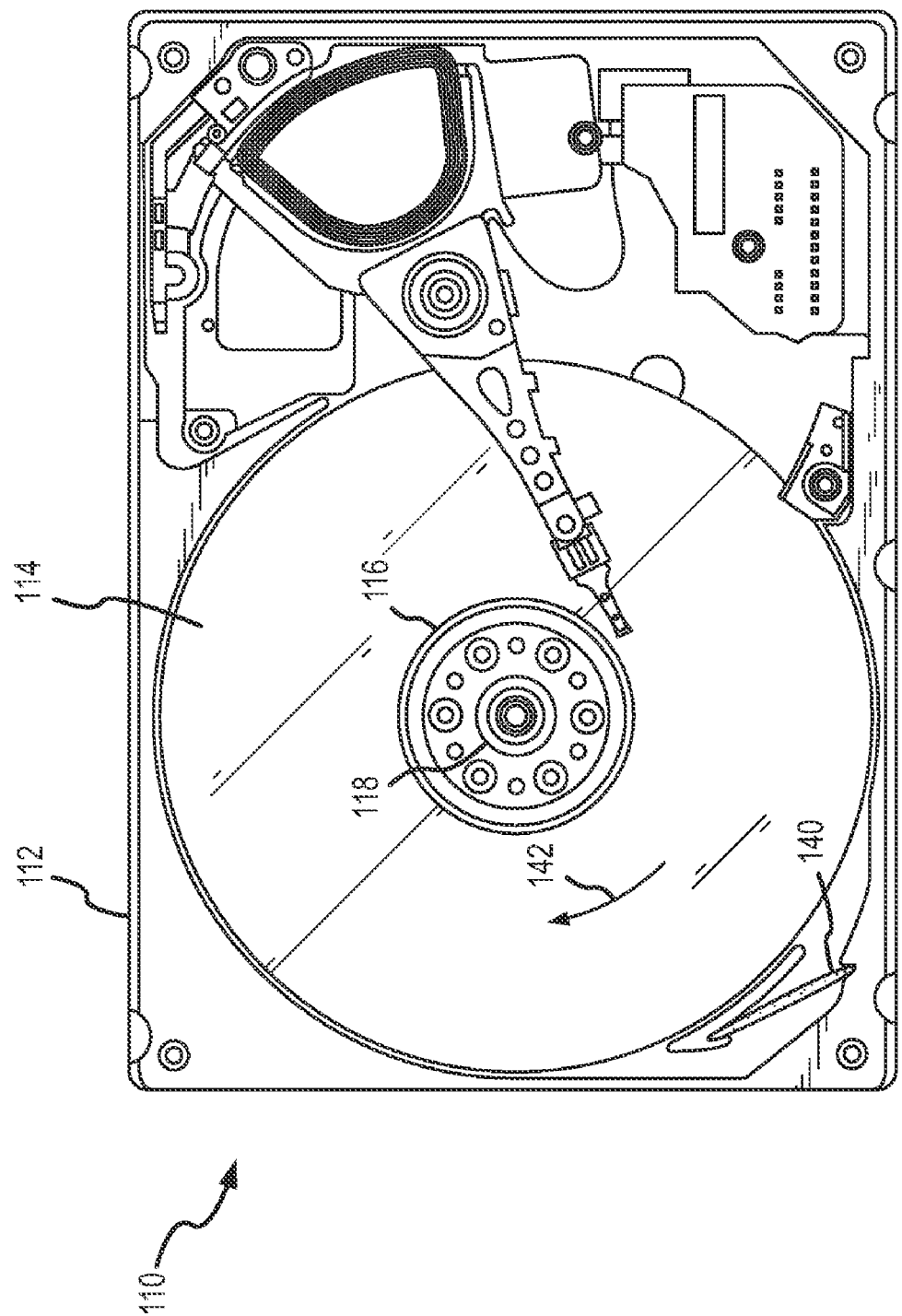
FIG. 1 illustrates a disk drive assembly according to an embodiment of the present invention.

By way of example, FIG. 1 illustrates one embodiment of a disk drive 110. The disk drive 110 generally includes a base plate 112 and a cover (not shown) that may be disposed on the base plate 112 to define an enclosure for the various disk drive components. The disk drive 110 includes one or more data storage disks 114 of any appropriate computer-readable data storage media. Each disk 114 is mounted on a hub or spindle 116, which in turn is rotatably interconnected with the disk drive base plate 112 and/or cover. Rotation of the disk(s) 114 is provided by a spindle motor 118 that is coupled to the spindle 116 to simultaneously spin the data storage disk(s) 114 at an appropriate rate.

The disk drive 110 can include one or more filters adapted to capture particulate contaminants contained within the disk drive 110. For example, a recirculation filter 140 can be placed within the disk drive 110 to capture particulate contaminants. As the disk 114 rotates in the direction indicated by arrow 142, air flows generally along the periphery of the disk 114 in the same direction as the rotation of the disk. The recirculation filter 140 is disposed along a channel and within the flow of this airstream to capture particulates that are suspended in the airstream.

In addition, a disk drive assembly 110 can also include a breather filter (not illustrated). A breather filter is disposed between the enclosed space defined by the disk drive enclosure and the outside environment. As the disk drive operates and the disk 114 spins at a high rate of speed, heat is developed within the enclosed space. The breather filter enables the pressure that builds between the warm enclosed space and the outside environment to be relieved. That is, as the disk drive 110 operates and produces heat, air flows out of the disk drive assembly. When the drive ceases operation, the interior of the drive cools and air is drawn into the disk drive assembly through the breather filter. In this regard, the breather filter is also adapted to capture particulate contaminants that could damage the disk drive. Integrated filters, which combine the functionality of a recirculation filter and a breather filter, are also known in the art According to the present invention, impurities, which can include particulates and gaseous contaminants are captured within an enclosed space, such as a disk drive assembly, by reacting the gaseous contaminants to alter the polarity and reduce the molecular weight of the gaseous contaminants, and thereafter capturing the reacted gaseous contaminants. Preferably, the gaseous contaminants are reacted in the presence of a catalyst that is adapted to catalyze the reaction. The filter and method of the present invention can be implemented in a disk drive assembly, or similar device, as a recirculation filter, a breather filter or an integrated filter.

The gaseous contaminants can include a variety of organic molecules such as esters, including organic acid esters, and hydrocarbons, including aliphatic hydrocarbons. Examples of aliphatic hydrocarbons include alkanes, alkenes and alkynes, and many of these types of hydrocarbons originate from the adhesives or the lubricating oils and greases that are utilized in a disk drive. For example, hydrocarbons are known to be the largest contributor to outgassing in a disk drive, and can be particularly deleterious when they are within the presence of sensitive electronic equipment. At typical disk drive operating temperatures, these hydrocarbons can exist in the gas phase and can be transported throughout the drive. When the drive cools, these hydrocarbons can condense and deposit onto surfaces (e.g., the magnetic disk surface) and can negatively affect the operability of the disk drive.

However, these non-polar organic molecules are not readily adsorbed by typical adsorbents utilized in disk drive assemblies due to the non-polar nature of the hydrocarbons. Adsorption is a process whereby chemical compounds adhere to the surface of the adsorbent, and chemical filtration units typically utilize activated carbon to adsorb chemicals onto the carbon surface. However, chemical adsorption is promoted by the presence of polar groups, and hydrocarbons are not polar in nature. It is particularly difficult to capture long chain aliphatic hydrocarbons such as those having a chain length greater than C8. While shorter chain length hydrocarbons can absorb into the activated carbon, those having a chain length in the range of C20 to C40, which include those that originate from oils and greases used within a disk drive, are not readily able to absorb or adsorb.

According to one embodiment, the organic molecules are reacted, preferably in the presence of a catalyst, to alter the polarity and reduce the molecular weight of the organic molecules, making them more amenable to adsorption by an adsorbent. The catalyst is one that is adapted to assist in the reaction of the organic molecules, and particularly in reducing the molecular weight and altering the polarity of the organic molecules, such as by an oxidation reaction that adds a polar organic group comprising oxygen to the molecule. For example, the organic molecules can be oxidized in the presence of the catalyst whereby the oxidized molecules have a reduced molecular weight as compared to the original organic molecules. In particular, long chain hydrocarbons are preferably oxidized to form polar compounds, for example, aldehydes, ketones and/or alcohols, that can be readily adsorbed by an adsorbent. The polar compounds improve the thermodynamics of the adsorption process and the reduced molecular weight of the oxidized molecules improves the kinetics of the adsorption process.

Preferably, the oxidation reaction of the gaseous contaminant organic molecules takes place in the presence of a catalyst at a temperature of from about 20° C. to about 85° C., such as from about 20° C. to about 50° C. The catalyst is selected to catalyze the oxidation reaction at these temperatures. The catalyst will typically include a metallic material that is finely dispersed on a support such that the catalyst has a relatively high surface area for efficient contact with the organic molecules. Preferred catalysts for this function can include copper, ruthenium, palladium, platinum and alloys or mixtures thereof. Examples of such catalysts include the CMX family of catalysts available from Engelhard Corp., Iselin, N.J. The catalyst can also include a co-catalyst, such as a metal oxide, particularly alumina or lanthanide series metal oxides such as lanthanum oxide or cerium oxide. A co-catalyst can advantageously reduce the temperature at which the oxidation reaction occurs efficiently.

The catalyst can be supported on a substrate, such as a unitary planar substrate (e.g., a metal sheet), a metal screen or polymer mesh, or can be supported on a porous substrate having a high surface area to facilitate access to the catalyst by the gaseous contaminants and to facilitate the reaction of the organic molecules.

According to one embodiment, the catalyst is supported on a porous material selected from silicates, zeolites and molecular sieves. These materials can advantageously serve the dual functions of providing a high surface area support for the catalyst and acting as an adsorbent for the contaminants, since these materials can advantageously both adsorb and absorb contaminants. For example, a porous molecular sieve having a pore size range of from about 10 Å to about 45 Å and a surface area of at least about 400 $m^2/g$ and not greater than about 925 $m^2/g$ can be used as the catalyst support.

After the organic molecules are reacted, the reacted organic molecules must be captured such as by absorption and/or adsorption onto an adsorbent material. According to one embodiment, the adsorbent material includes activated carbon or a zeolite. Zeolites, such as those having a controlled pore size in the range of 3 Å to 75 Å, can be particularly useful as they are capable of capturing contaminants by both adsorption and absorption. Absorption is a function of the diameter of the molecule and the pore size of the zeolite can be selected to absorb a particular size range of organic molecules.

The catalyst and adsorbent can be admixed, such as where the catalyst is supported on the adsorbent, or the catalyst and adsorbent can be physically separated. In the latter case, the catalyst can be positioned directly in an air stream such that the air stream containing the gaseous contaminants contacts the catalyst before contacting the adsorbent. Although it is preferred that the catalyst be disposed proximal to the adsorbent, it is also possible to have the catalyst and adsorbent physically separated within the enclosed space.

Figure 2:
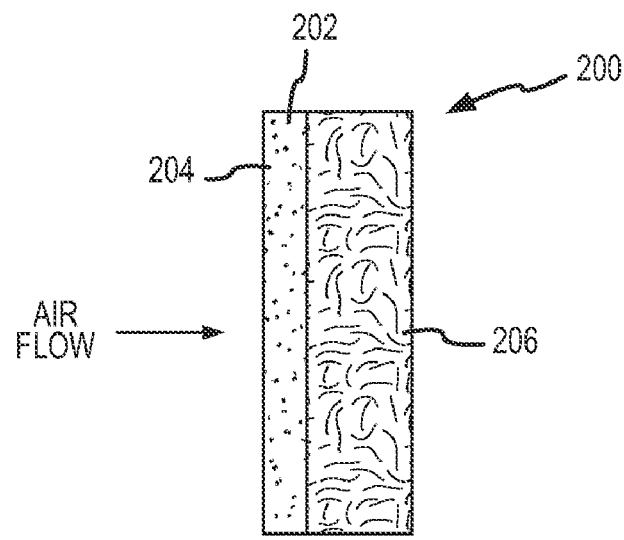
FIG. 2 is a cross-sectional view of a filter device according to an embodiment of the present invention.

A filter device according to one embodiment is illustrated in FIG. 2. The filter device 200 includes a catalyst 202 that is dispersed on a substrate 204. The substrate 204 is disposed between the incoming air stream and the adsorbent 206. In this way, the air stream contacts the catalyst 202 before coming in contact with the adsorbent 206 so that the gaseous contaminants within the air stream are reacted in a reaction catalyzed by the catalyst 202 before being adsorbed by the adsorbent 206.

Figure 3:
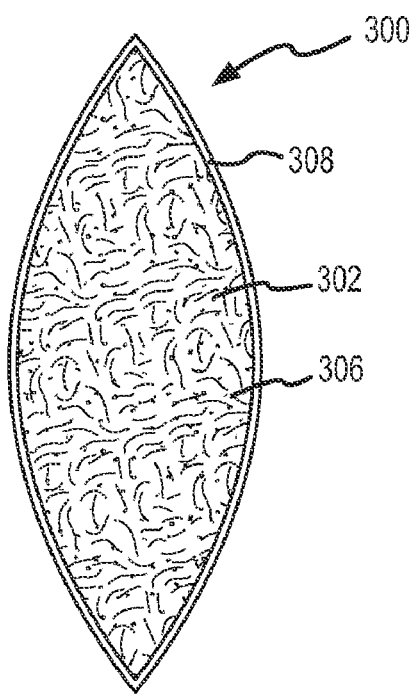
FIG. 3 is a cross-sectional view of a filter device according to an embodiment of the present invention.

According to one embodiment, the catalyst and adsorbent are placed in a scrim bag, such as a polytetrafluoroethylene (PTFE) polymer mesh bag, that enables air flow through the bag while holding particulate materials within the bag. One such embodiment is illustrated in FIG. 3. The filter device 300 includes a catalyst 302 that is dispersed upon a porous material 306. The porous material 306 advantageously serves as both a high surface area support for the catalyst 302 and as an adsorbent for capturing reacted gaseous contaminants, including those that are oxidized in the presence of the catalyst 302. Both the catalyst 302 and the porous material 306 are disposed within a scrim bag 308 which enables an air stream to flow into and through the bag 308.

Figure 4:
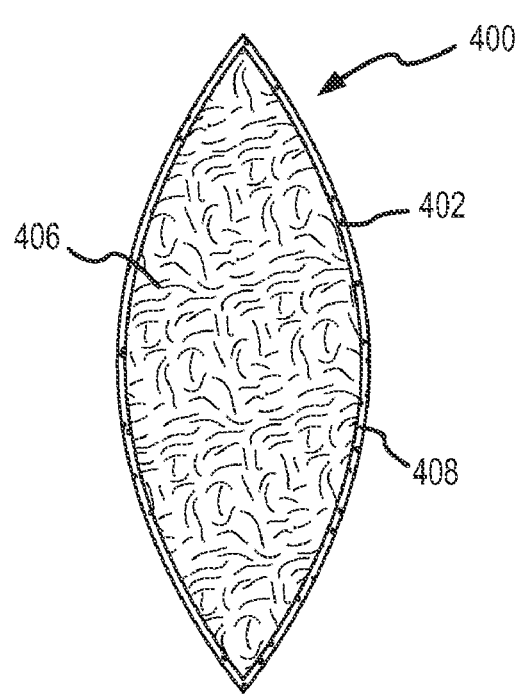
FIG. 4 is a cross-sectional view of a filter device according to an embodiment of the present invention.

According to another embodiment, the catalyst can be dispersed on the scrim bag surface and the adsorbent can be placed within the scrim bag, as is illustrated in FIG. 4. The filter device 400 includes a scrim bag 408 upon which the catalyst 402 is dispersed. The catalyst can be dispersed on the interior or exterior portions of the scrim bag 408. An adsorbent 406 is disposed within the scrim bag, and the adsorbent 406 can optionally have additional catalyst dispersed thereon. In this manner, air flowing through the scrim bag first contacts the catalyst 402 before contacting the adsorbent material 406.

The filter can be positioned in a disk drive device as a recirculation filter. As is illustrated in FIG. 1, the recirculation filter is placed in the disk drive enclosure adjacent to the disk(s) 114, such that the air flow created by the rotation of the disk(s) impinges upon the filter. Particulates and gaseous contaminants that are suspended in the flow of air are thereby removed by the filter.

Alternatively, the filter of the present invention can be utilized as a breather filter, where the filter is disposed between the enclosed space and the external environment. As heat is developed within the enclosed space of the disk drive assembly, the breather filter enables the pressure that builds between the warm enclosed space and the outside environment to be relieved. Thus, as the disk drive operates and produces heat, air flows out of the disk drive assembly. When the drive ceases operation, the enclosed space cools and air is drawn into the disk drive assembly through the breather filter. Breather filters are generally adapted to capture particulate contaminants that could damage the disk drive.

According to one embodiment, the filter device can include two or more different adsorbents for the efficient capture and sequestration of two or more gaseous contaminants. For example, a fist adsorbent can include zeolite and a second adsorbent can include activated carbon.

The embodiments described above are for exemplary purposes only and are not intended to limit the scope of the present invention. Various adaptations, modifications and extensions of the described device/method will be apparent to those skilled in the art and are intended to be within the scope of the invention.

What is claimed is:

1. A method for removing gaseous contaminants from a data storage device, comprising the steps of:
    within a data storage device, reacting non-polar organic gaseous contaminants contained in an air stream with a catalyst disposed on a substrate of porous support material to form at least polar organic gaseous contaminants, the catalyst configured to assist in the reaction by adding oxygen to the non-polar organic gaseous contaminants; and
    retaining the polar organic gaseous contaminants with an adsorbent.

2. The method of claim 1, wherein said non-polar organic gaseous contaminants comprise long chain aliphatic hydrocarbons.

3. The method of claim 2, wherein said long chain aliphatic hydrocarbons are selected from the group consisting of alkanes, alkenes and alkynes.

4. The method of claim 1, wherein said catalyst is disposed on the surface of adsorbent material.

5. The method of claim 1, wherein said reacting step occurs at a temperature of at least about 20° C. and not greater than about 85° C.

6. The method of claim 1, wherein said retaining step comprises the steps of:
    adsorbing a first portion of the polar organic gaseous contaminants with a first adsorbent; and
    adsorbing a second portion of the polar organic gaseous contaminants with a second adsorbent that is different than said first adsorbent.

7. The method of claim 1, wherein said catalyst comprises a metal selected from the group consisting of copper, ruthenium, palladium, platinum and mixtures thereof.

8. The method of claim 7, wherein said catalyst further comprises a cocatalyst selected from the group consisting of alumina, ceria and mixtures thereof.

9. The method of claim 1, wherein said adsorbent is selected from the group consisting of a zeolite, a silicate and activated carbon.

10. The method of claim 1, wherein said adsorbent is selected from the group consisting of a zeolite and activated carbon.

11. The method of claim 1, wherein the porous support material supporting the catalyst further comprises the adsorbent.

12. A method for removing gaseous contaminants from a data storage device, comprising the steps of:
    positioning a filter in an air stream of the data storage device, the filter including an exterior portion and an interior portion;
    reacting non-polar organic gaseous contaminants contained in the air stream with a catalyst dispersed on the exterior portion of the filter to form at least polar organic gaseous contaminants, the catalyst configured to assist in the reaction by adding oxygen to the non-polar organic gaseous contaminants; and
    retaining the polar organic gaseous contaminants with the interior portion of the filter, the interior portion including an adsorbent.

* * * * *